United States Patent

[11] 3,554,297

[72] Inventor Charles L. Lehman
    Rte. 3, Box 53, Corpus Christi, Tex. 77715
[21] Appl. No. 652,220
[22] Filed July 10, 1967
[45] Patented Jan. 12, 1971

[54] CULTIVATOR
    5 Claims, 6 Drawing Figs.
[52] U.S. Cl. ..................................... 172/741,
    172/742, 172/573
[51] Int. Cl. ........................................ A01b 15/00
[50] Field of Search ........................... 172/484,
    548, 569, 574, 579, 581—584, 599, 600, 741, 742,
    743, 158, 159, 184, 307, 586—588, 595, 642, 654,
    681, 685, 696

[56] References Cited
    UNITED STATES PATENTS
    838,798   12/1906  Mitchell, Sr. .................. 172/696
    1,017,465  2/1912  Rampley ....................... 172/654
    3,080,004  3/1963  McNair ......................... 172/587
    3,203,487  8/1965  Whitesides .................... 172/548
    2,081,784  5/1937  Weems .......................... 111/73
    2,691,353 10/1954  Secondo ........................ 111/73

Primary Examiner—Robert E. Pulfrey
Assistant Examiner—James W. Peterson
Attorney—Hyer, Eickenroht, Thompson & Turner ABSTRACT: A cultivator having a frame comprising a tool bar adapted to be moved longitudinally along laterally spaced-apart rows of crops planted on a single bed, and three brackets attached in laterally spaced-apart relation along the tool bar. A gang of rotary hoes supported on a beam carried by the intermediate bracket includes a first pair of gang sections connected to the beam near its opposite ends for movement over the oppositely facing inner sides of rows, and a second pair of gang sections mounted on the beam laterally outwardly of the first pair of gang sections for movement over the outer sides of the rows. Means are provided for adjusting the lateral and angular positions of each of the gang sections. A gang of rotary hoes is carried on each outer bracket for movement over opposite sides of the bed rearwardly and laterally outwardly of the gang sections.

PATENTED JAN 12 1971

Charles L. Lehman
INVENTOR.

BY Brownings, Simne, Ayer
& Eickenroht
ATTORNEYS

Charles L. Lehman
INVENTOR.

BY Browning, Simms, Hyer & Eickerrodt
ATTORNEYS

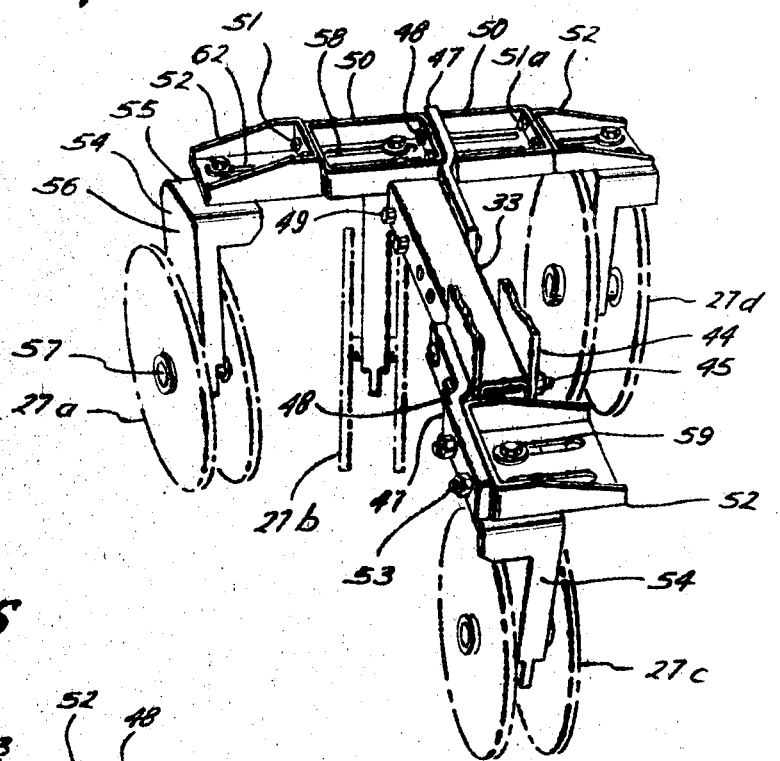
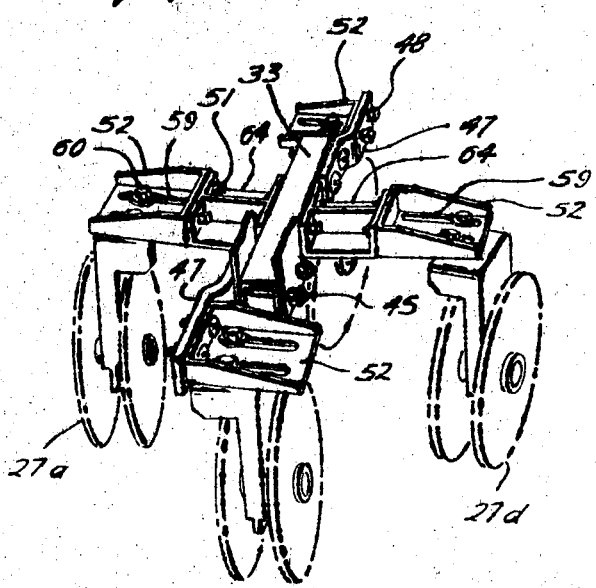

CULTIVATOR

This invention relates in general to cultivators. In one of its aspects, it relates to improvements in cultivators of the type shown and described in Lehman et al. U.S. Pat. No. 2,994,387. In another of its aspects, this invention relates to improvements in rotary hoe gang assemblies useful in these and other types of cultivators.

In the cultivator shown in this prior patent, a set of three gangs of ground driven rotary hoes is mounted on a frame for cultivating each row of crops. One gang moves directly over the row while each of the other two move along a side of the row. The row gang is angularly adjustable so that as it breaks up the soil in and around the crop, it also removes weeds therefrom without damaging the roots of the crop. The side gangs follow the row gang and are angularly adjustable into positions for either throwing soil from the side of the row onto the weeds or pulling soil away from adjacent the crop. The side gangs are also tiltable from one side to the other for moving uniformly over the sides of the row, whether the crop is planted on top of the bed or in the furrow. Each gang is so supported from the frame that it floats with respect to the others, whereby each is free to follow the contour of the land.

In the use of this cultivator as well as modifications thereof, difficulties arose in cultivating narrow rows of crops, some of which might be no more than 10 inches apart. Narrower gangs of hoes were not the answer, because there might nevertheless be interference between the free-floating supports for the various gangs. That is, in these prior cultivators, the side-by-side beams by which each of the gangs was swingably suspended from the frame made it impossible to get the gangs close enough together for narrow row cultivation. My copending application, Ser. No. 436,525, filed Mar. 2, 1965, and entitled "Cultivator," shows and describes a cultivator having improved means for supporting the rear gangs which permits the cultivation of these narrower rows.

Further difficulty was encountered in working in and around the crop by means of the front gang of prior cultivators of this type, particularly when the crop was tall. For this purpose, it has been proposed to split the front gang into two sections in order to straddle the crop. More particularly, in a modification of the cultivator shown and described in the prior patent, the split sections of the front gang are laterally adjustable relative to one another and individually angularly adjustable to permit their front ends to be angled toward or away from one another.

Even these latter improvements have not solved the problems raised by what is known as multiple-row planting, wherein two or more rows of crops are planted on each bed, often less than ten inches apart. Obviously, the mere splitting of the row gang does not permit both rows of crops to be worked in the manner described. Furthermore, it will be apparent to those skilled in the art that a mere duplication of such split gangs would not be expected to provide an answer, at least consistent with the already limited space in and around existing cultivators of this type.

It is, therefore, an object of this invention to provide a cultivator of this type having a front gang assembly of such construction as to work both rows of crops without interfering with other parts of the cultivator or the tractor for pulling it.

Another object is to provide such a cultivator in which the front gang is mounted by only a single support which is of minimum length and yet which permits the gang sections to be arranged in different manners best suited to the remainder of the cultivator construction.

A further object is to provide such a cultivator in which certain gang sections of the front gang assembly may be disposed in tracking relation with respect to one another for working between very closely spaced row crops on the bed.

A still further object is to provide such a cultivator in which the gang sections of the row gang assembly may be adjusted laterally for cultivating different spacing between the rows of crops on the bed.

Yet a further object is to provide front gang assemblies of the type described which may be mounted on the frame in such a manner as to permit the cultivation of very narrow, broadcast fed rows of crops.

These and other objects are accomplished, in accordance with the illustrated embodiment of the present invention, by a cultivator comprising a frame having, as in the earlier cultivators of this type, gangs of rotary hoes supported thereon for movement over the sides of the bed as the frame is moved longitudinally therealong. A gang of rotary hoes is also supported on the frame for movement over the rows of crops forwardly and laterally between the first mentioned gangs. More particularly, this row gang comprises gang sections arranged in pairs for movement over opposite sides of each row, and means for angularly and laterally adjusting each of the gang sections with respect to one another.

More particularly, the cultivator includes three brackets adapted to be attached in laterally spaced-apart relation along a tool bar or other frame member and a beam is swingably mounted on each of the outer brackets to support the rear gangs for movement over the sides of the bed. In the preferred form of the invention, a parallelogram linkage is connected to the intermediate bracket for swinging about a horizontal axis, and a longitudinally extending beam is connected to the linkage for vertical movement with it. A first pair of gang sections are connected to the beam near its opposite ends for movement over the oppositely facing inner sides of the rows of crops, and the second pair of gang sections are mounted on the beam laterally outwardly of the first pair for movement over the outer sides of the double row of crops. In one arrangement of these gang sections, the second pair are releasably connected to opposite sides of the beam intermediate its opposite ends, while in another arrangement thereof, the second pair of gang sections are releasably connected to opposite sides of the front gang section of the first pair.

Each rotary hoe gang assembly of the row gang includes a pair of longitudinally extending bars each having its opposite ends laterally offset from one another. The end of one bar is connected to one side of the front end of the beam with its other end extending longitudinally beyond the front end. The end of the other bar is connected to the other side of the rear end of the beam with its outer end extending longitudinally beyond the rear end. Each gang of the first pair of gang sections is then connected to the longitudinally extending end of one of the bars, so that, with the longitudinally extending ends of the bar spaced laterally outwardly from the side to which the bar is connected, the gang sections connected thereto are disposed in substantial axial alignment with one another as well as the longitudinal axis of the beam.

In the cultivation of broadcast fed rows of crops, the second pair of gang sections are arranged on opposite sides of the front gang section of the first pair, and a plurality of the so arranged gang assemblies are mounted from brackets connected in laterally spaced apart relation along a frame. More particularly, one such gang assembly is connected with the three gangs along its one end disposed forwardly, while the adjacent gang assembly is disposed with the three gang sections along its one end disposed rearwardly thereof. The three gang sections of one assembly are laterally opposite the one gang section of its adjacent gang assembly, whereby the adjacent gang sections of adjacent gang assemblies may be disposed close enough together for cultivating crops across the width of the frame.

In the drawings, wherein like reference characters are used throughout to designate like parts:

FIG. 4 is a perspective view of the front gang with its gang sections arranged as shown in FIGS. 1 and 3;

FIG. 5 is a perspective view similar to FIG. 4, but with the gang sections arranged in a different manner.

Figure 1:
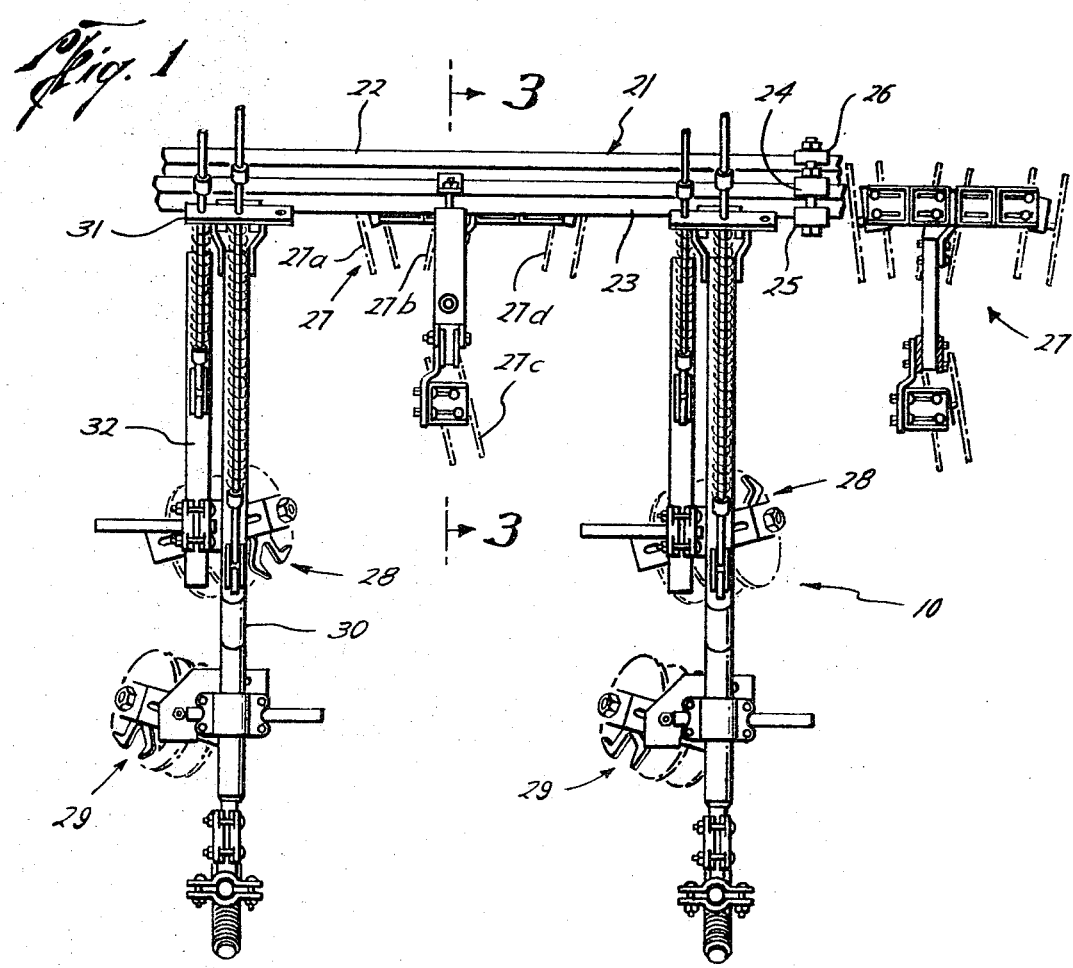
FIG. 1 is a top plan view of a cultivator constructed in accordance with the present invention.

With reference now to the details of the above-described drawings, the cultivator which is shown in FIG. 1 and designated in its entirety by reference character 10 comprises a laterally extending frame 21 movable in a longitudinal direction — i.e., in an upward direction — over laterally spaced apart crops. As illustrated, this frame includes a first tool bar 22 adapted to be connected to a tractor or other towing vehicle (not shown) in the usual manner and a second tool bar 23 connected to the bar 22 and spaced above it (see FIG. 3). These tool bars are interconnected by a clamp having a common header 24 and upper and lower clamp members 25 and 26 bolted thereto, as shown and described in detail in my copending application.

Figure 2:
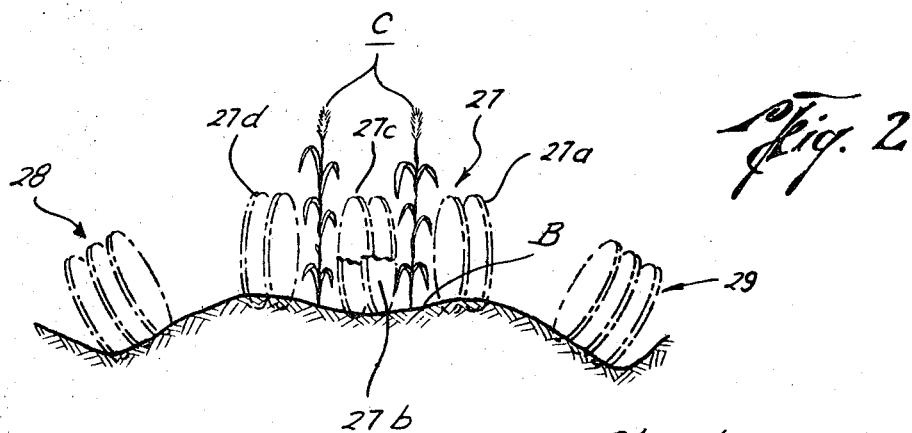
FIG. 2 is a diagrammatic front end view of the gangs of rotary hoes of the cultivator of FIG. 1 as they move over a double row of crops planted on a single bed.

As previously described, a front or row gang 27 is mounted on the frame 21 for movement over the laterally spaced apart rows of crops C planted on the single bed B, as shown in FIG. 2. More particularly, individual sections 27a, 27b, 27c and 27d of the row gang 27 move over opposite sides and intermediate the double row of crops C, as will be described in more detail to follow. On the other hand, the inboard gangs of the pair of rear gangs 28, 29 on opposite lateral sides of the row gang 27 are adapted to move over the sides of the bed B, as also shown in FIG. 2. These rear gangs are tilted at approximately the angle of the side of the bed in a manner described in detail in the aforementioned copending application, Ser. No. 326,525.

As illustrated in FIG. 1, and as described in detail in my copending application, one of the rear gangs 29 of each pair is supported on a relatively long beam 30, which is pivotally connected at its forward end to a bracket 31 releasably attached to the tool bar 23 of the frame for extension rearwardly therefrom longitudinally with respect to the row of crops — i.e., parallel to the direction of movement of the frame. The other gang 28 of each pair is supported on a second, shorter beam 32 for disposal beneath the beam 30. More particularly, and as described in the copending application, the long beam 30 includes a raised section which extends above the gang 28, and a lower section which is offset from the upper section and supports the gang 29. The beam 32 is also swingably mounted upon the bracket 31 so as to extend rearwardly therefrom parallel to and relatively near the long beam 30.

Although only the inboard gang of each pair of rear gangs is required in cultivating the sides of the single bed B of FIG. 2, the outboard gangs are, of course, used to cultivate the sides of adjacent beds. Thus, as well known in the art, both the row and rear gangs may be multiplied out along the frame for cultivating a desired number of multiple planted rows.

The gang sections 27a, 27b, 27c and 27d are mounted on a longitudinally extending beam 33 supported on the tool bar 23 by means of a parallelogram-type linkage 34. More particularly, in the illustrated embodiment of the front gang wherein it is adapted to move over double rows planted on the bed B, there are four such gang sections, one pair for each row. Thus, as best shown in FIG. 2, the gang sections 27b and 27c are so mounted on the beam 33 as to move between the spaced double-row crops C, while the gang sections 27a and 27d are so mounted as to move over the outer sides of the bed B. More particularly, the pair of gang sections 27a and 27b are angularly adjusted to work the soil around the left-hand crop C, while the gang sections 27c and 27d are angularly adjusted to work around the right-hand crop C.

Figure 3:
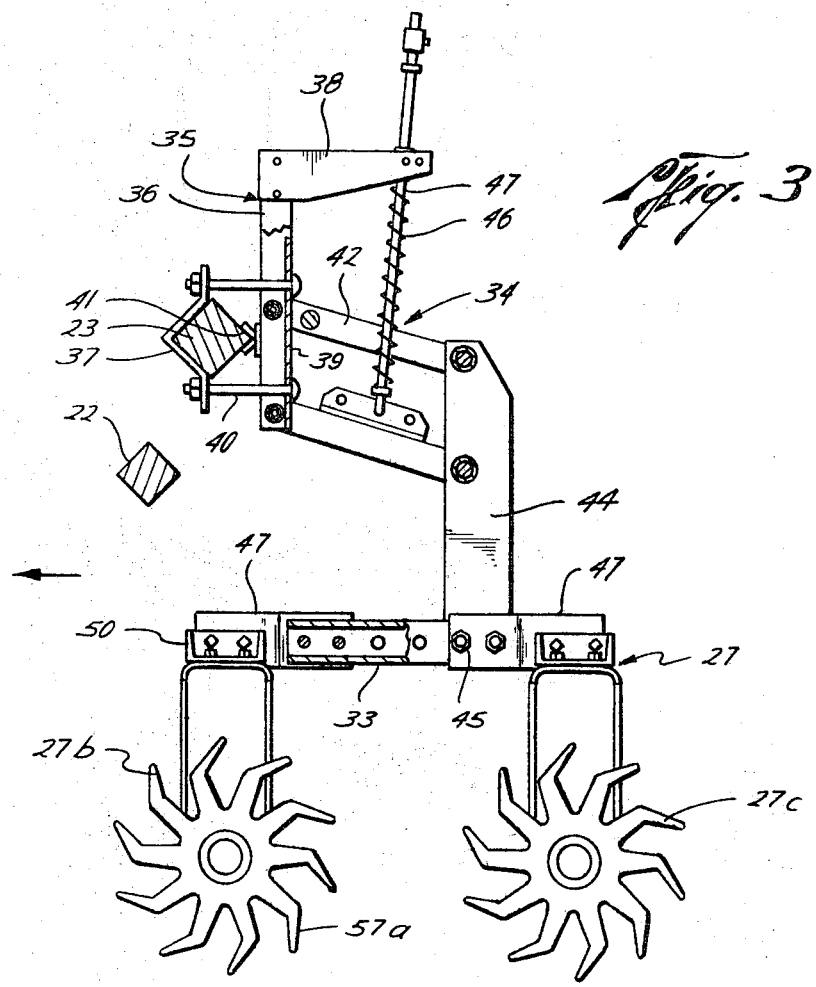
FIG. 3 is an enlarged sectional view of the front gang and its support, as seen along broken line 3—3 of FIG. 1.

As shown in FIG. 3, the linkage 34 is mounted on the tool bar 23 by means of a bracket 35 which comprises laterally spaced apart uprights 36 releasably attached to the tool bar by means of a yoke 37. The uprights 36 are connected at their upper ends by a rearwardly extending flange 38, and along an intermediate portion by a plate 39 against which the bolts 40 of the clamp 37 engage. This bracket 35 is held with respect to the tool bar 23 by means of a saddle 41 on the inner sides of the uprights 36 opposite the V-clamp 37.

The parallelogram linkage includes upper and lower links 42 and 43, respectively, pivotally connected at one end to the uprights 36 and at their opposite ends to uprights 44. The lower ends of the uprights 44 are, in turn, secured to the longitudinally extending beam 33 by means of bolts 45. Thus, as the linkage 34 swings about its ends pivoted to the bracket 35, the uprights 44 maintain their vertical positions and thereby cause the longitudinally extending beams to move parallel to a horizontal plane. Consequently, although the rotary hoes of the gang sections are free to rise and fall with the contour of the land, their lower ground-engaging portions are maintained in parallel planes. In this manner, the substantially flat top surface of the bed B will be engaged with substantially equal force by each of the gang sections as they move thereover.

As will be apparent, the gang sections will engage the ground surface with some force merely due to the influence of gravity. Also, they may be urged downwardly with the desired amount of induced force by means of a coil spring 46 disposed about a rod 47 connected at its lower end to a plate across the lower links 43 and extending upwardly through the rearwardly extending flange 38.

The beam 33 is square in cross section and, as shown in FIG. 3, hollow throughout its length. The bolts 45 connect it to the lower end of uprights 44 toward its rear end, and the beam is of such length that the gang section 27b at its end is generally beneath the tool bar 23. Thus, even when the gang sections 27a and 27d are arranged on opposite sides of the gang section 27b, as shown in FIG. 4, no part of the row gang 27 is disposed any substantial distance forwardly from the front end of the frame. Consequently, there is no interference with the wheels of the tractor or other parts of the towing mechanism.

At the same time, the gang section 27c at the rear end of the beam 33 leaves the area on opposite sides of the beam 33 relatively free so that there is no interference with the supports for the rear gangs, even in modifications of this type of cultivator where these supports require more space than those shown in FIG. 1. Furthermore, in view of the particular means of supporting the rear gangs shown in FIG. 1, the gang sections 27a and 27d may instead by arranged rearwardly of gang section 27b and on opposite sides of an intermediate portion of the beam 33, as shown in FIG. 5.

As best shown in each of FIGS. 3, 4 and 5, a bar 47 is connected to one side of the front end of the beam 33, and another bar 47 is connected to the opposite side of the rear end of the beam 33. As shown in FIGS. 4 and 5, each bar has laterally offset, parallel end portions interconnected by a central bent portion 48. More particularly, in the arrangements of the gang sections shown in both of FIGS. 4 and 5, one end portion of each bar is so connected to the beam as to dispose the other end portion thereof beyond the end of the beam and laterally offset from the side of the beam to which such one end portion is connected.

As also shown in FIGS. 4 and 5, the entire end portion is held against the side of the beam with the intermediate bent portion 48 disposed at substantially the end of the beam, so that the entire length of the other end portion extends longitudinally beyond the end of the beam. Also, since the rear bar 47 is held against the outer surface of one of the uprights 44, it can be connected to the rear end of the beam 33 by the same bolts extend through the beam to connect it to the lower ends of the uprights 44. On the other hand, the front bar 47 is connected to the side of the front end of the beam 33 by means of additional bolts 49 extending through the bar as well as the hollow beam 33.

The oppositely facing inner ends of the bars 47 are spaced apart a distance sufficient to permit mounting of the gang sections 27a and 27d to opposite sides of the intermediate portion of the beam, as shown in the arrangement of the gang sections illustrated in FIG. 5. In this way, substantially all of the parts for the two arrangements of gang sections for the front gang 27 may be identical, thereby reducing to a minimum the inventory required in stocking for both arrangements of the gang sections.

As shown in the arrangement of FIGS. 3 and 4, the gang section 27b is mounted on the front end of beam 33 by a mounting plate 50 having upwardly extending flanges thereabout. This plate is connected to one side of the longitudinally extending end portion of front bar 47 by means of bolts 48 extending through one of its flanges. Thus, as shown, the mounting plate 50 and the gang section 27b supported therein are in substantial alignment with the axis of the beam 33.

The gang section 27c, on the other hand, is mounted on the rear end of the beam 33 by a mounting plate 52 having a flange connected to the inner side of the longitudinally extending end of the rear bar 47 by means of bolts 53 extending therethrough. This disposes the plate and thus the gang section 27c in substantial alignment with the axis of beam 33, and thus with respect to the gang section 27b. This mounting plate 52 need not have a flange about its side opposite the holes for bolts 53 since there is nothing connected to the opposite ends of these mounting plates.

In the arrangement of FIG. 5, the rear gang section 27c may be mounted on the beam in the same manner as above described in connection with the arrangement of FIG. 4. Also, since the gang sections 27a and 27d of the FIG. 5 arrangement are connected to opposite sides of an intermediate portion of the beam 33, the front gang section 27b may be supported from another mounting plate 52.

As shown in FIGS. 4 and 5, each gang section comprises a bracket 54 having an upper wall 55 angularly disposed with respect to a downwardly extending wall 56. An axle 57 extends from opposite sides of the lower end of the wall 56 for mounting one or more rotary hoes 57a thereon. More particularly, the wall 56 connects with the wall 55 toward one side of the latter. Thus, as will be described, bolts may be passed through holes in the wall 55 for connecting each of the brackets 54 to a mounting plate.

A pair of slots 58 extend laterally across the mounting plate 50, and a similar pair of slots 59 extend laterally across the mounting plate 52. These receive bolts which extend through the top wall 55 of the bracket 54, so that washers beneath nuts on the bolts suspend the gang sections from the lower sides of the mounting plates. Tightening of the nuts will hold the top wall 55 of each bracket securely against the bottom of its mounting plate so as to secure the gang section against tilting or angling with respect to the bracket.

With the bolts connecting each of the gang sections 27b and 27c to their respective mounting plates disposed toward the ends of the slots nearer the bars 47, such bolts and thus the centers of the gang sections are at least substantially aligned with the longitudinal axis of the beam 33 and thus with respect to one another. Thus, as illustrated in FIG. 2, the gang sections 27b and 27c may be so arranged as to substantially track one another and thereby permit such gangs to get into the smallest possible spacing between the double row crops C. As also illustrated, the gang section 27b is angled in one direction to cooperate with the gang section 27a in working one row of crops, while the gang section 27c is angled in the other direction to cooperate with the gang section 27d in working the other row of crops.

In the arrangement of FIG. 4, the gang section 27a is supported from mounting plate 52 connected by bolts 51 to a flange of mounting plate 50 opposite the flange thereof connected to the front bar 47. The laterally extending slots 59 of this mounting plate 51 receive mounting bolts 60 which extend upwardly through the top wall 55 of bracket 54 for suspending gang section 27a therefrom.

The gang section 27d, on the other hand, is supported from another mounting plate 52 connected to the outer side of front bar 47 by means of another mounting plate 50, which in this case, however, merely serves as a spacer. This mounting plate is connected to the bar 47 by the same bolts 48 that connect plate 50 to the inner side of the same bar. The laterally extending slots 59 in the right-hand plate 52 receive bolts to support the bracket 54 of gang section 27d therefrom. In this manner, with the gang sections 27b and 27c substantially tracking one another, the gang section 27d can be positioned at substantially the same lateral distance from the gang section 27c with which it cooperates that the gang section 27a is spaced laterally from the gang section 27b with which it operates.

As previously mentioned, the arrangement of the gang sections shown in FIG. 5 differs from that shown in FIG. 4 in that the sections 27a and 27d are connected to opposite sides of the beam intermediate its ends, rather than to opposite sides of the gang section 27a mounted on the front end of the beam. A conversion from the FIG. 4 to the FIG. 5 arrangement may be made with a minimum of time and effort and only a few additional parts.

Thus, bolt holes through an intermediate portion of the beam 33—i.e., between the oppositely facing ends of front and rear bars 47 47—receive bolts for connecting the sections 27a and 27d thereto. For this latter purpose, and as shown in FIG. 5, gang sections 27a and 27d are supported from the same mounting plates 52, each of which is mounted on one side of the beam 33 by means of a spacer element 64. These spacer elements are identical to one another to further reduce inventory to a minimum.

Flanges on one side of each of the spacer elements 64 enable it to be connected to opposite sides of the beam by means of bolts passing through the aforementioned holes in the beam 33. More particularly, in the illustrated embodiment, these holes in opposite sides of the beam are aligned with one another so that the spacer elements 64 are connected to the beam by a single pair of bolts. A flange on the opposite side of each spacer element 64 enables a mounting plate 52 to be connected thereto by means of the bolts 51, as in the case of the connection of the mounting plates 52 in the FIG. 4 arrangement. Thus, the gang sections 27a and 27d may be spaced equal distances from the gang sections 27b and 27c, respectively, with which they cooperate in working a row of crops.

The bars 47, as well as additional spacer elements not shown enable considerable lateral adjustment of each gang section relative to the other gang sections. This may be necessary, for example, in case the rows of crops are spaced wider apart than that for which the gang sections are arranged, as illustrated. Thus, it may be desirable to move the gang sections 27b and 27c between the rows of crops laterally apart from one another. A slight amount of lateral spacing between the gang sections 27b and 27c may be accomplished by turning each of the bars 47 over so that its outwardly extending end portion would be spaced laterally inwardly of the side of the beam 33 to which the bar is connected, and, as a consequence, each mounting plate connected to such outwardly extending end portion of the bar would be moved laterally a corresponding amount. Alternatively, of course, the mounting plates supporting the gang sections 27b and 27c may be connected to the outer sides of the bars 47 to thereby provide even greater lateral spacing between the gang sections 27b and 27Still further, the bars 47 could be turned over and the mounting plates supporting the gang sections 27b and 27c connected to their outer sides to thereby provide a lateral spacing between the gang sections somewhat intermediate that previously described.

It is also obvious that considerable adjustment of the lateral spacing between the gang sections 27a and 27d, as well as between each of them and the gang sections 27b and 27c, may be accomplished by the use of additional and/or wider or narrower spacer elements. The possibilities, in this regard, are so varied that a discussion of all of them is beyond the scope of this disclosure. In any case, however, the basic arrangement would be the same in that the gang sections would be arranged in pairs for working each row of crops on the single bed, with one such gang section for working the inner side of one row being near the front end of the beam 33, another for working the inside of the other row being near the rear end of the beam 33, and the remaining gang sections 27a and 27d being disposed laterally outwardly from the gang sections 27b and 27c for working the outer sides of these row crops.

Lateral adjustment of the gang sections relative to one another, as well as relative to the mounting plates from which they are supported, is also made possible by shifting of the bolts supporting the bracket 54 of each gang section in a direction laterally within the slots arranged in each such plate. For example, in the FIG. 4 arrangement as well as the FIG. 5 arrangement, some lateral spacing between the gang sections 27b and 27c may be accomplished by moving the mounting bolts for section 27b to the left and the mounting bolts for section 27c to the right. On the other hand, a smaller lateral spacing between each pair of gang sections for working a single crop may be accomplished, in the arrangements of FIGS. 4 and 5, by moving the mounting bolts for the gang sections 27a and 27d in a direction toward the beam from that shown in FIGS. 4 and 5. Obviously, this adjustment requires that the nuts on the bolts be loosened, as when it is desired to adjust the angular relation of each gang section with respect to the ground over which it moves.

Figure 6:
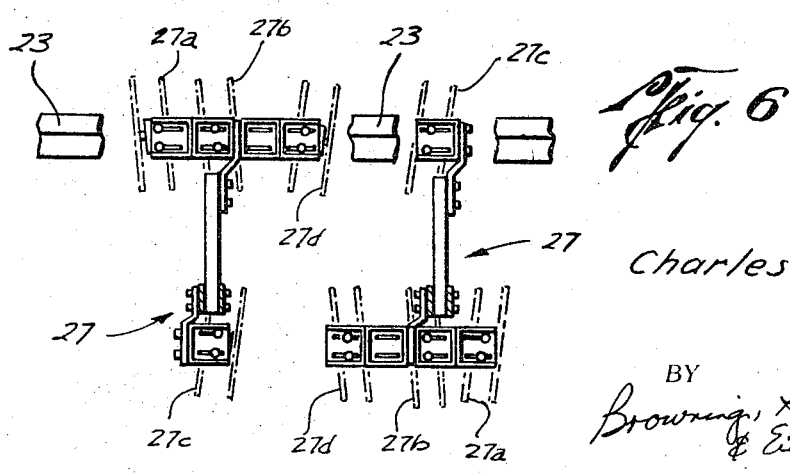
FIG. 6 is a top plan view of a pair of front gang assemblies having gang sections arranged as shown in FIGS. 1, 3 and 4 and mounted on a tool bar for cultivating broadcast fed crops.

As shown in FIG. 6, in the cultivation of broadcast fed crops, the sections of the gang 27 are arranged as shown in FIG. 4 and then mounted on the tool bar 23 in oppositely disposed end-to-end relation. That is, one such gang is arranged with the three gang sections 27a, 27b and 27d at the forward end of the beam 33 and the gang section 27c at the rear end thereof, while the adjacent gang 27 is mounted on the tool bar with the gang section 27c at its forward end and the gang sections 27a, 27b and 27d at its rear end. In this manner, the adjacent gangs 27 may be arranged laterally of one another so as to in effect provide a continuous broadcast cultivator from one end of the frame to the other. That is, gang sections of one gang 27 may be arranged for working a row immediately adjacent a row being worked by gang sections of the adjacent gang 27.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

I claim:

1. A rotary hoe gang assembly, comprising a longitudinally extending beam; a pair of longitudinally extending bars each having its opposite ends laterally offset from one another, the end of one bar being connected to one side of the front end of the beam with its other end extending longitudinally beyond said front end and laterally offset from said one side, the end of the other bar being connected to the other side of the rear end of the beam with its other end extending longitudinally beyond said rear end and laterally offset from said other side, a first pair of gang sections, means releasably connecting each gang section of said first pair to the longitudinally extending end of one of said bars, a second pair of gang sections, means releasably mounting each gang section of said second pair to the beam on opposite sides and laterally outwardly from the gang sections of said first pair, and means for laterally and angularly adjusting each of said gang sections with respect to one another.

2. A gang assembly of the character defined in claim 1, wherein the longitudinally extending end of each bar is spaced laterally outwardly from the side of the beam to which it is connected so as to dispose the gang sections of said first pair in substantial alignment with one another and the longitudinal axis of said beam.

3. A gang assembly of the character defined in claim 2, wherein said connecting means includes a gang section mounting plate releasably connected to the inner side of each bar, and said mounting means includes a gang section mounting plate releasably connected to the outer side of the mounting plate connected to the front bar, a spacer plate connected to the outer side of the longitudinally extending end of the front bar, and a second gang section mounting plate releasably connected to outer side of the second plate.

4. A gang assembly of the character defined in claim 2, wherein said connecting means includes a gang section mounting plate releasably connected to the inner side of each bar, and said mounting means includes spacer plates connected to opposite sides of the beam intermediate its opposite ends, and a pair of gang section mounting plates each connected to the outer side of a spacer plate.

5. A cultivator adapted to be moved longitudinally over laterally spaced row crops, comprising a laterally extending frame adapted to be moved in a longitudinal direction, a pair of brackets connected in laterally spaced-apart relation along the frame, a support connected to each bracket and having a front end and a rear end, three rotary hoe gang sections connected laterally across the front end and one gang section connected to the rear end of one support, one rotary hoe gang section connected to the front end of the other support substantially laterally of the three sections connected to the front end of said one support and three gang sections connected laterally across the rear end of said other support substantially laterally of the one gang section connected to the rear end of said one support, and means for angularly and laterally adjusting each of the gang sections with respect to one another.